United States Patent [19]

Kwan

[11] 4,042,004

[45] Aug. 16, 1977

[54] WINDOW ASSEMBLY

[75] Inventor: Gerald A. Kwan, Pasadena, Calif.

[73] Assignee: Hehr International Inc., Los Angeles, Calif.

[21] Appl. No.: 734,992

[22] Filed: Oct. 22, 1976

Related U.S. Application Data

[63] Continuation of Ser. No. 558,798, March 17, 1975, abandoned.

[51] Int. Cl.$^2$ .............................................. E06B 3/32
[52] U.S. Cl. ........................................ 160/91; 49/141; 49/408; 49/413; 49/449; 49/456; 49/501
[58] Field of Search ..................................... 160/89–91; 49/141, 401, 408, 413, 425, 428, 489, 495, 449, 445, 457, 501, 504, 404

[56] References Cited

U.S. PATENT DOCUMENTS

| | | | |
|---|---|---|---|
| 1,998,791 | 4/1935 | Schanz | 49/489 |
| 2,188,815 | 1/1940 | Murphy | 49/495 X |
| 2,736,076 | 2/1956 | Bush et al. | 49/495 |
| 2,739,358 | 3/1956 | Kunkel | 49/495 X |
| 2,830,843 | 4/1958 | Seaburg et al. | 49/141 X |
| 2,856,040 | 10/1958 | Dansereau | 49/408 |
| 2,877,511 | 3/1959 | Viola, Jr. | 49/413 |
| 2,877,840 | 3/1959 | Hurowitz et al. | 160/91 |
| 2,910,209 | 10/1959 | Nelson | 49/495 X |
| 2,918,706 | 12/1959 | Rust et al. | 49/408 |
| 3,070,856 | 1/1963 | Minick | 160/91 X |
| 3,080,023 | 3/1963 | Armstrong | 49/413 X |
| 3,106,754 | 10/1963 | Grossman | 49/485 X |
| 3,140,517 | 7/1964 | Richter | 49/489 |
| 3,226,780 | 1/1966 | Landis | 49/495 X |
| 3,325,944 | 6/1967 | Crain | 49/453 X |
| 3,374,580 | 3/1968 | Ruff | 49/495 X |
| 3,431,677 | 3/1969 | Ehret et al. | 49/141 |
| 3,449,863 | 6/1969 | Koch, Jr. | 49/428 |
| 3,555,736 | 1/1971 | Koch, Jr. et al. | 49/504 |
| 3,808,742 | 5/1974 | Ehret et al. | 49/413 |
| 3,827,184 | 8/1974 | Pennec et al. | 49/413 X |

OTHER PUBLICATIONS

"New No. 370 Series Door and Frame Assembly for ¼ inch By-Passing Doors", The Engineered Products Co. 1964, p. 24a.

Primary Examiner—Philip C. Kannan
Attorney, Agent, or Firm—Reed C. Lawlor

[57] ABSTRACT

An on-site reglazable window assembly suitable for mounting in an aperture in a wall of a recreational vehicle and comprising a stationary glass panel, a slidable glass panel, a slidable screen panel, and slidable storm panels. All of the panels are removably positioned within a generally rectangular frame formed of a unitary metal extrusion having a plurality of flanges which provide glazing channels for the panels and means for mounting the frame to the vehicle wall. One of the exterior flanges includes a key-shaped slot which receives a correspondingly keyed flexible gasket along the entire perimeter of the frame. The gasket has a plurality of splines attached to a compressible tube so that the splines and tube are compressed between the inner surface of the exterior flange and the outer surface of the vehicle wall. The slidable screen and storm panels slide within respective channels of a removable multiple channel track. The relative position of the stationary and slidable glass panels permits employment of a centrally located latch assembly.

The frame employs a sloped base to permit drainage of rain water and the like through at least one slot or weep hole in the bottom edge of the window assembly. A removable track used for the slidable glass panel employs widely separated support legs disposed to rest upon track ledges which lie within an intermediate glazing channel but displaced above the base surface to preclude obstruction of the draining water by the track support legs.

In one form of the invention, the frame is hingedly connected to the motor home wall and may be rotatably swung out about hinges.

4 Claims, 20 Drawing Figures

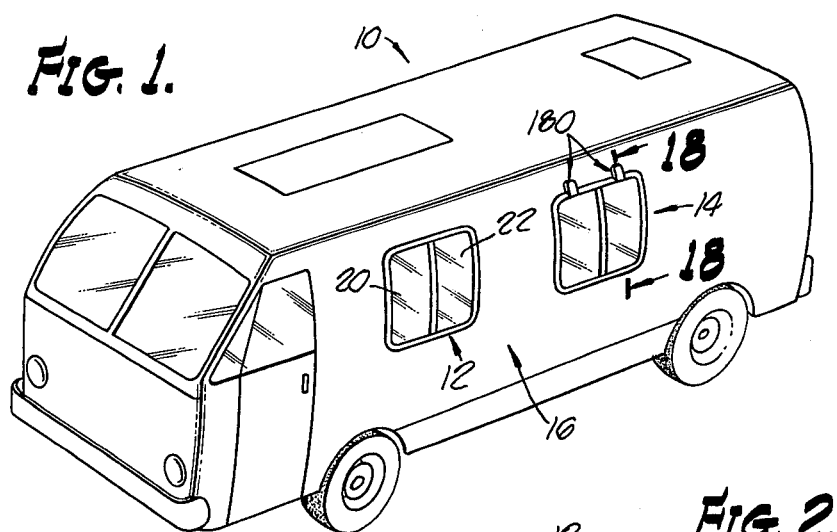
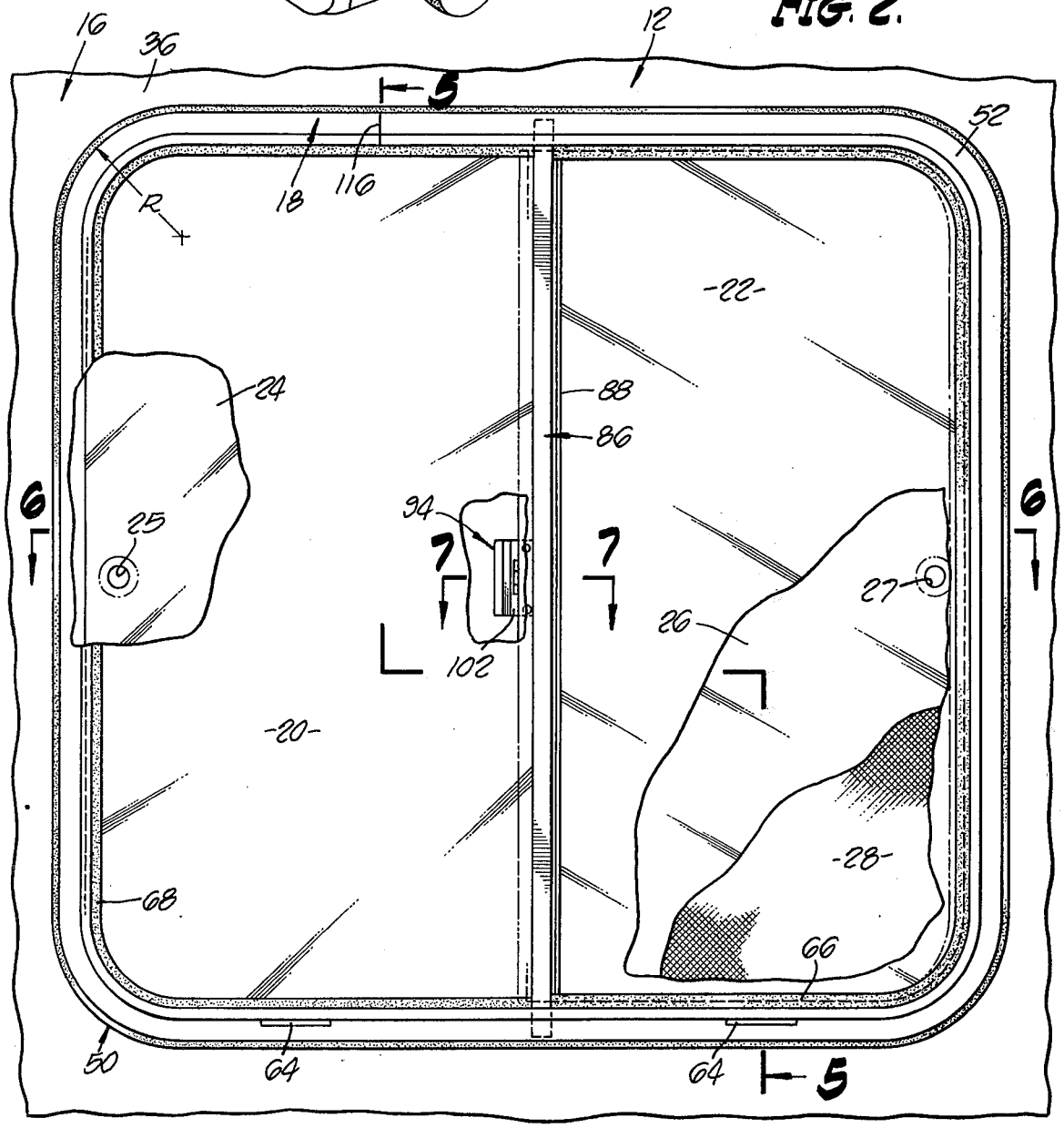

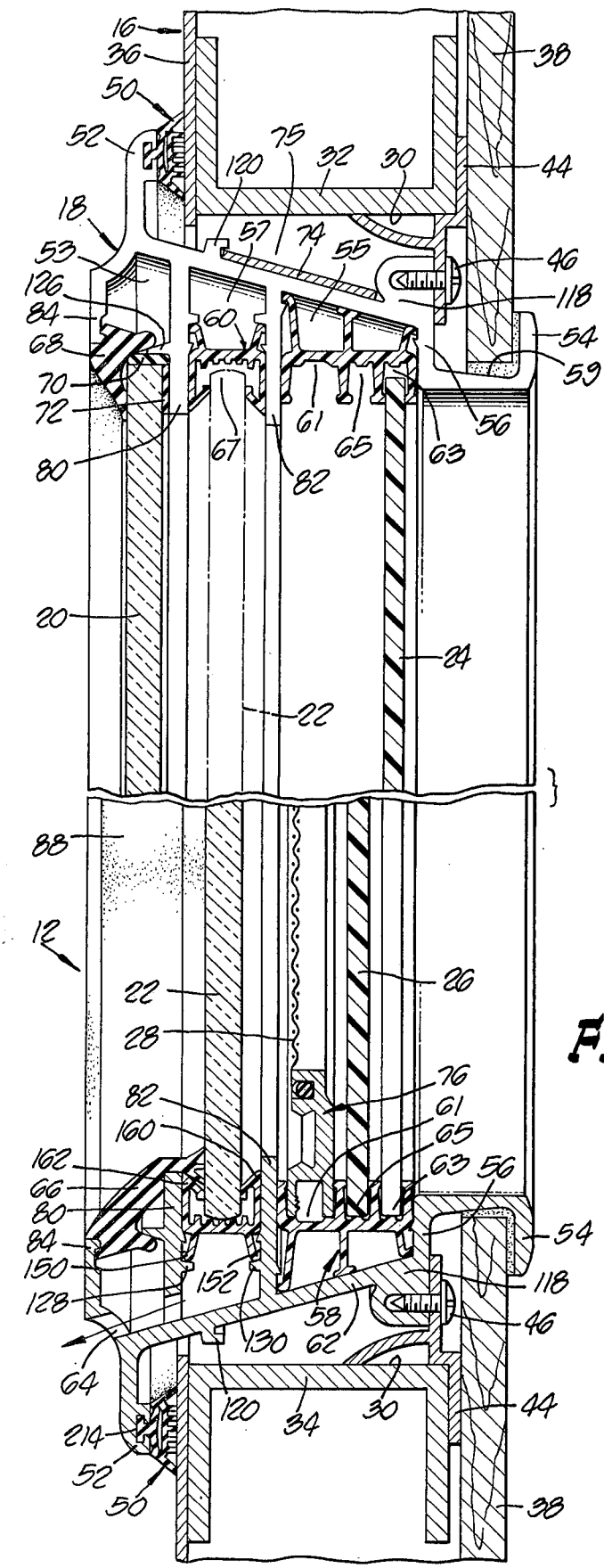
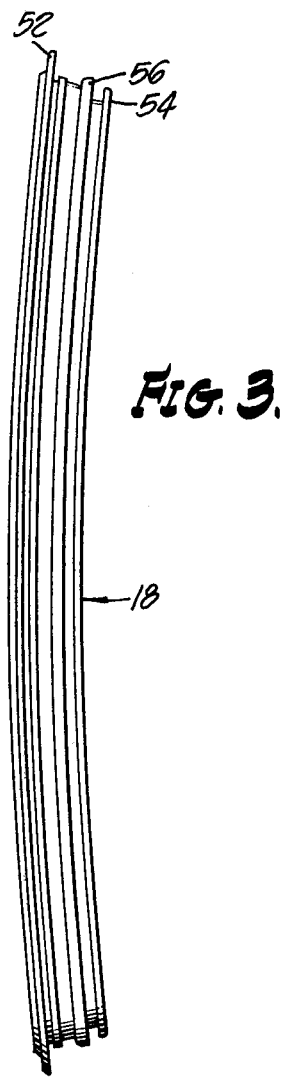
FIG. 3.
FIG. 5.
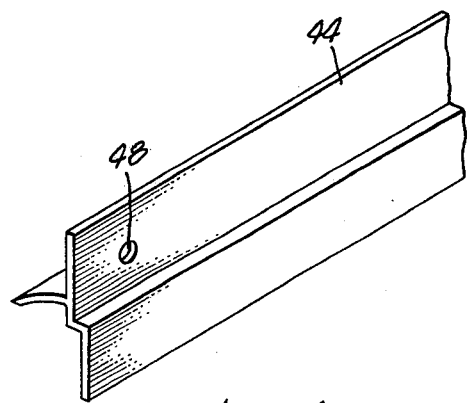
FIG. 4.

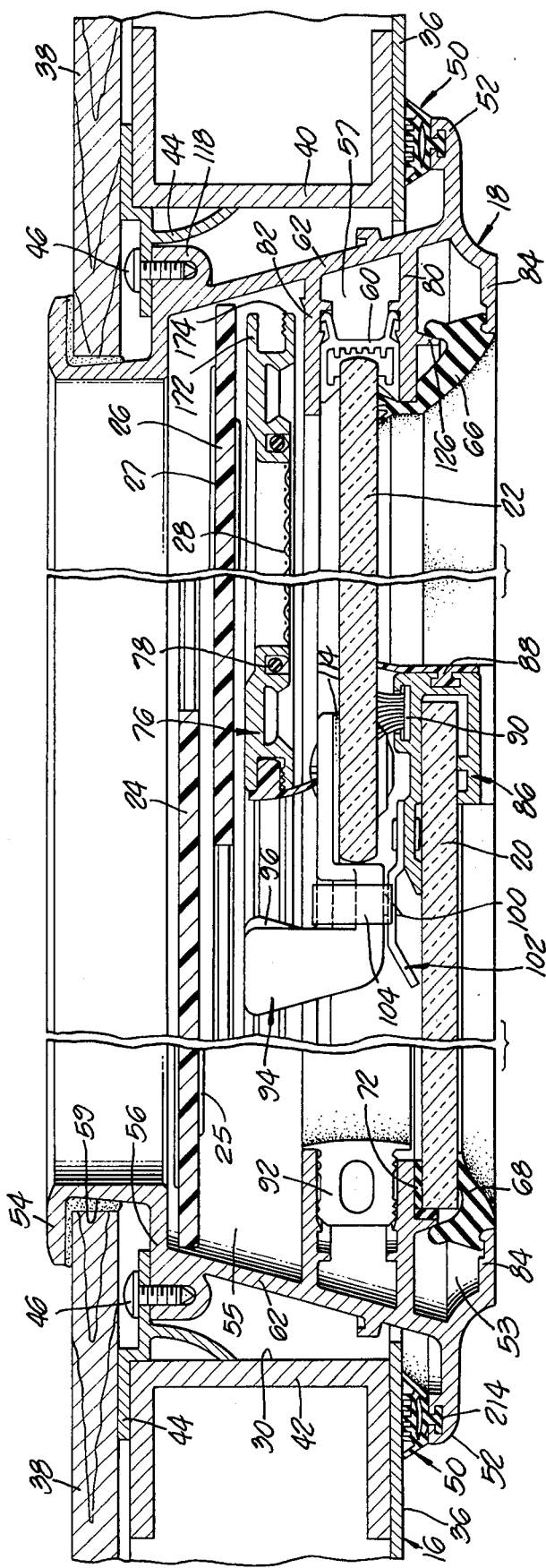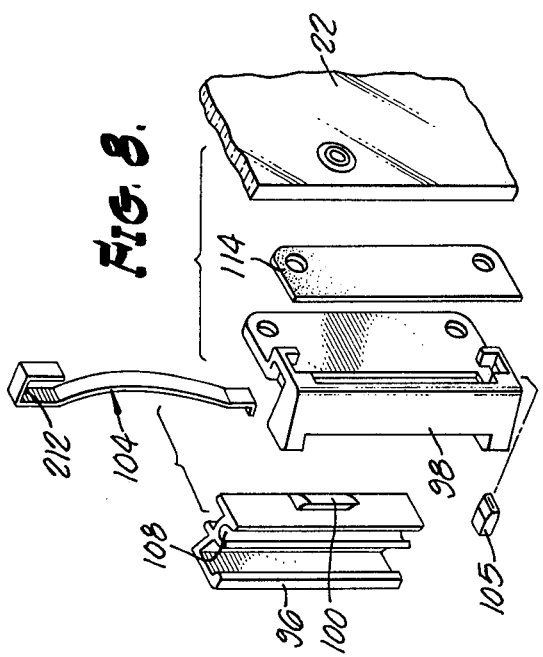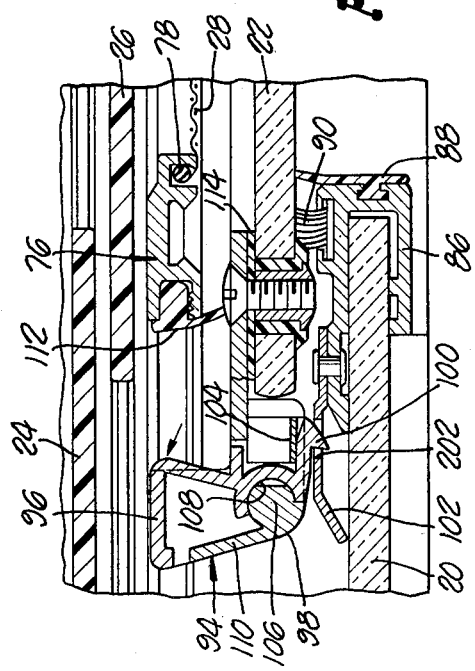

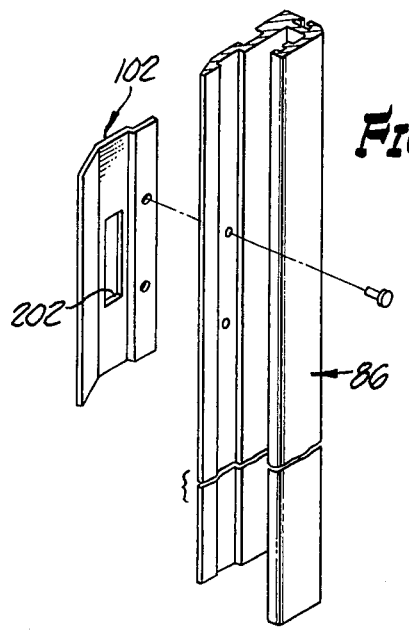
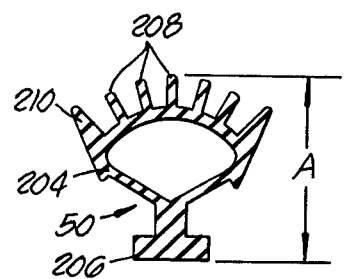
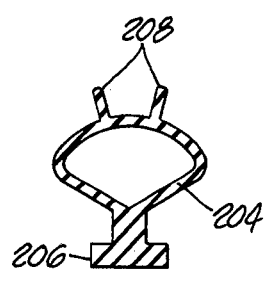
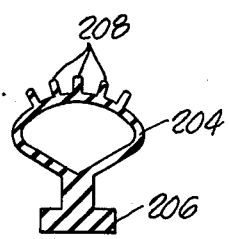
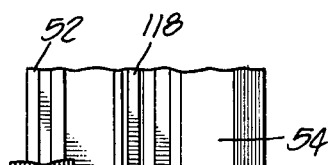
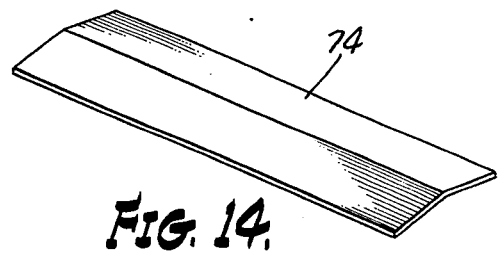

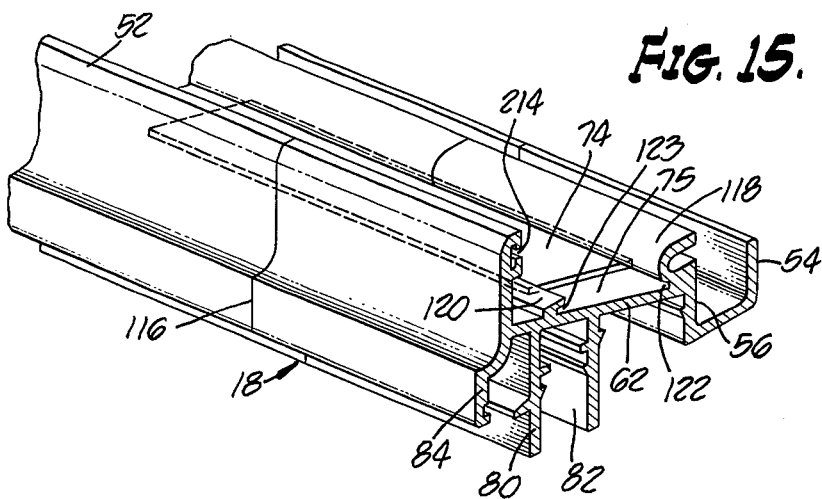
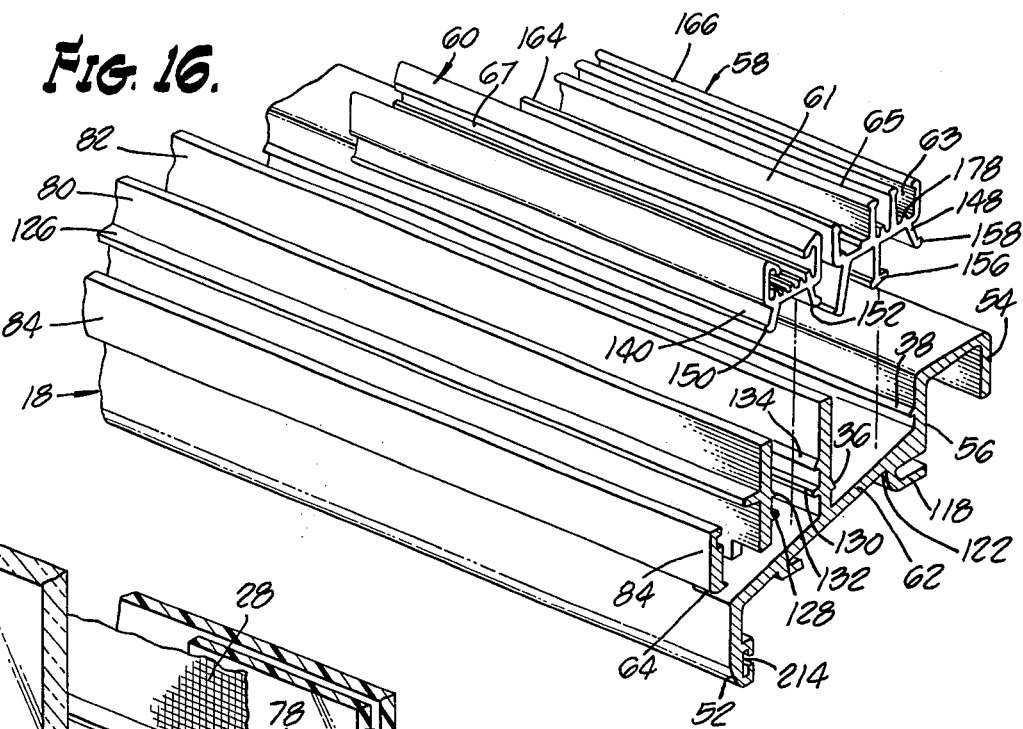
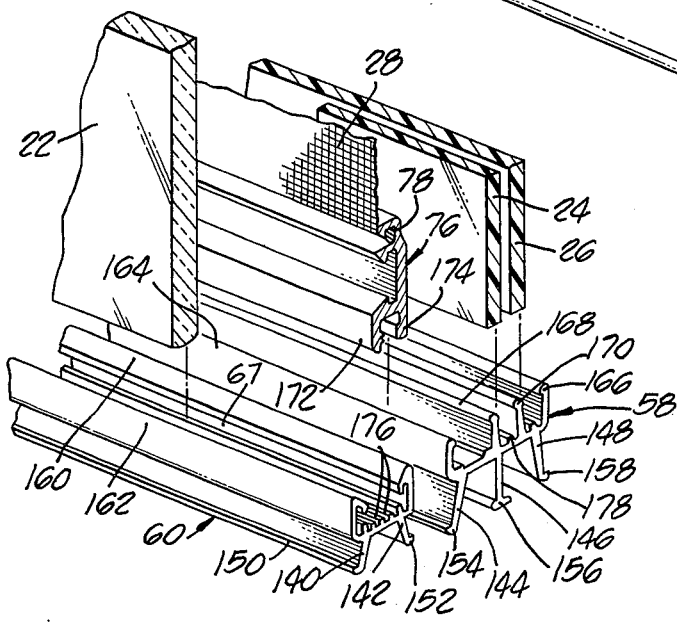

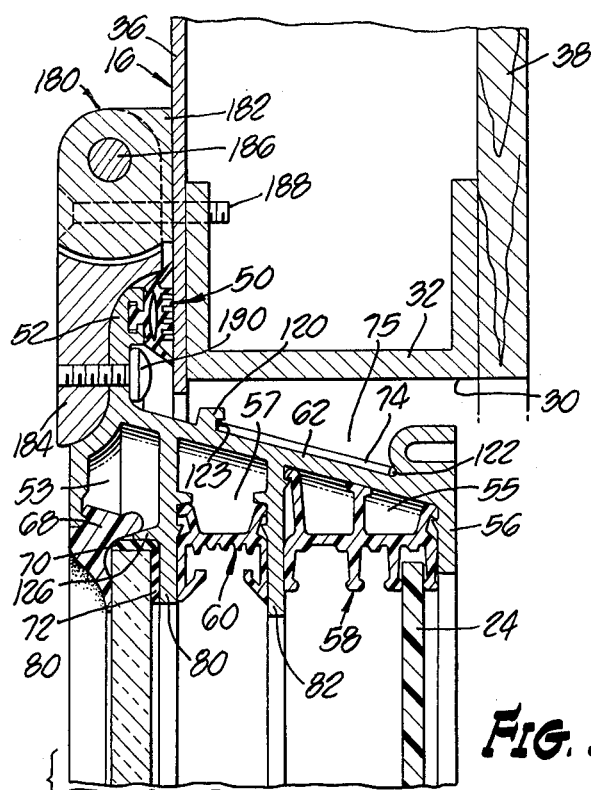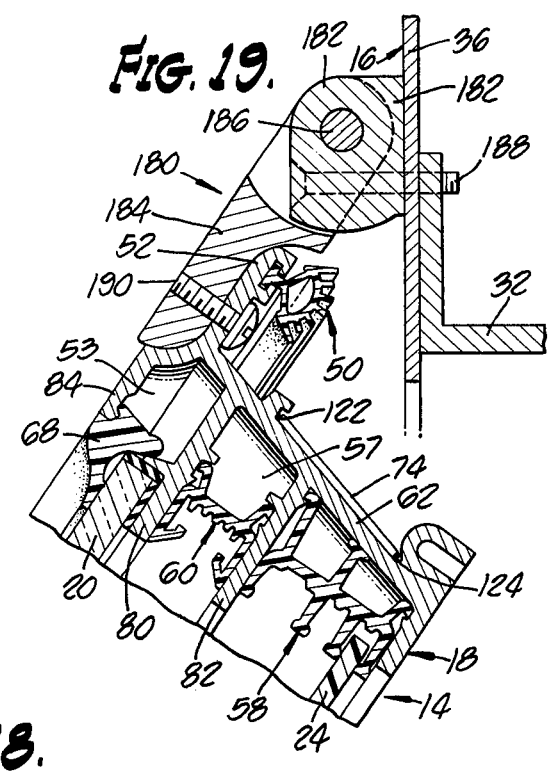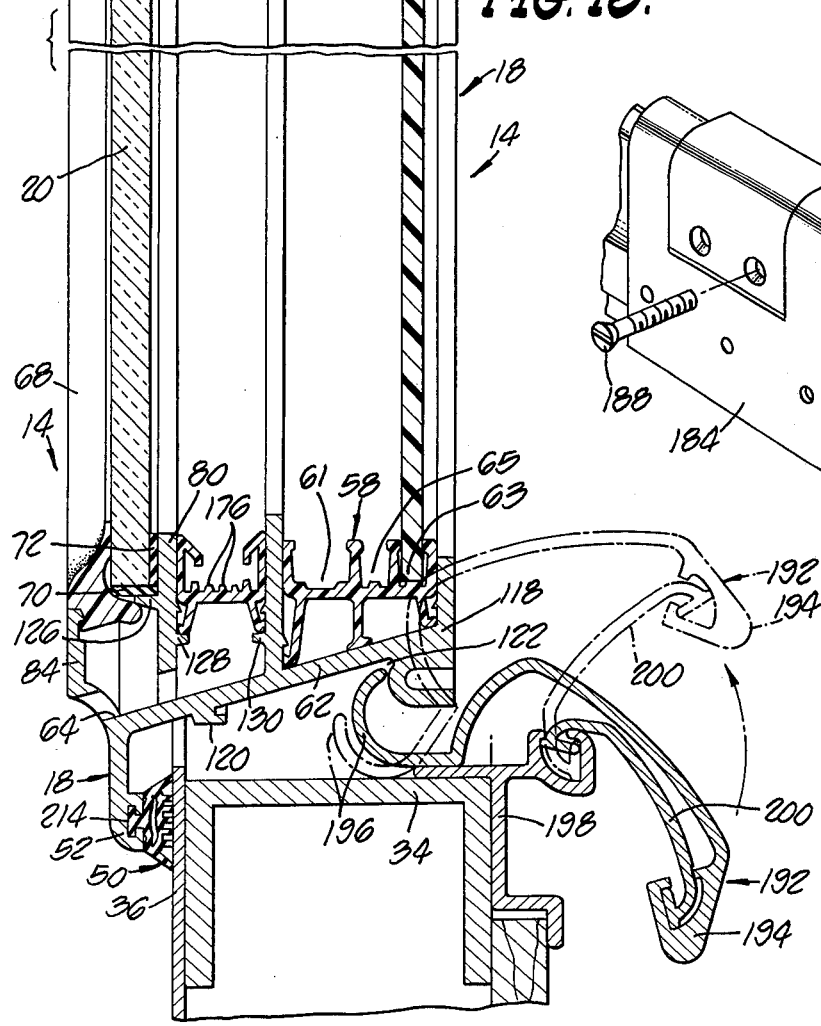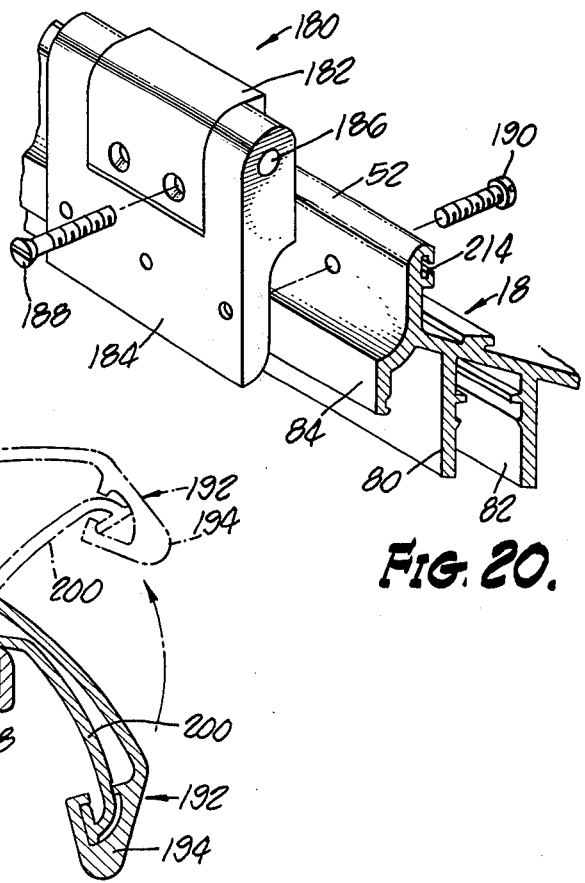

WINDOW ASSEMBLY

CROSS REFERENCES TO RELATED APPLICATIONS

This is a continuation, of application Ser. No. 558,798, filed Mar. 17, 1975, now abandoned.

Patent application Ser. No. 550,735, filed Feb. 18, 1975, now U.S. Pat. No. 3,981,067, in the name of PHILIP R. OILER, for METHOD OF SPLICING AND PRODUCTS THEREOF, discloses related subject matter.

INTRODUCTION

This invention relates generally to window structures for recreational vehicles and the like. This invention relates more particularly to improvements in a window assembly which employs an extruded unitary metal frame having channels therein for receiving a plurality of readily removable panels including a stationary glass panel, a slidable glass panel, a slidable screen panel, and slidable storm panels.

Window assemblies of the type to which improvements disclosed herein generally pertain are well known in the art. By way of example, one such window is described in U.S. Pat. No. 3,808,742, issued to Ehret et al. Such windows are generally adapted for installation in an aperture in a recreational vehicle wall and include a frame having an exterior cicumferential flange for lapping the exterior surface of the wall to partially or completely surround the aperture, and a plurality of interior circumferential flanges which form a number of channels suitable for receiving various panel members, some of which may be slidable to open and close the window.

It is a general object of this invention to provide a new window of the general type described above but including a number of improvements which make such windows simpler and less costly to manufacture and install and more convenient to use.

It is an object of this invention to provide a frame with a sloped base and at least one drainage slot wherein the base serves the dual function of structural support and means for draining rain water and the like to the exterior of the vehicle.

It is a further object of this invention to provide removable track means in the channels of the frame, some of which track means include multiple channels for receiving more than one of the panel members and some of which may be positioned in the frame channels to preclude obstruction of the aforementioned drainage.

It is a further object of this invention to provide a flexible splined sealing gasket which when inserted in a suitable receiving slot in the external circumferential flange and compressed against the exterior surface of the vehicle wall, provides an effective weather resistant seal.

It is a further object of this invention to provide a sealing gasket to seal the window frame to the vehicle wall without requiring any external fastening means.

It is still a further object of this invention to provide hinge means whereby the aforementioned window may be swung away from the wall aperture in which it is installed.

A still further object of this invention is to provide a plurality of window panels which, by vitue of their relative positions within the window frame channels, permit the location of a latch assembly which renders the window assembly more convenient to use.

DESCRIPTION OF THE DRAWINGS

The foregoing and various additional objects, features, and advantages, will be set forth hereinafter in a sufficient degree to enable a person skilled in the art to practice the invention. The invention is described in connection with the drawings wherein:

FIG. 1 is a perspective view of a recreational vehicle incorporating two embodiments of the window assembly in which features of the present invention are utilized;

FIG. 2 is an elevational view of a window assembly comprising the fixed embodiment illustrated in FIG. 1;

FIG. 3 is an end view of the frame of this invention;

FIG. 4 is a fragmentary perspective view of a retaining clamp of this invention;

FIG. 5 is an enlarged sectional view taken along line 5—5 of FIG. 2 with an intermediate portion omitted;

FIG. 6 is an enlarged sectional view taken along the lines 6—6 of FIG. 2; with intermediate portions omitted;

FIG. 7 is an enlarged sectional view taken along the lines 7—7 of FIG. 2;

FIG. 8 is an exploded perspective view of a latch assembly of this invention;

FIG. 9 is an exploded fragmentary perspective view of elements to which the latch assembly of FIG. 8 may be secured;

FIGS. 10-12 are cross-sectional views of different forms of sealing gaskets of this invention;

FIG. 13 is an enlarged sectional rear view of the frame and of a broken-away portion of the sealing gasket installed therein;

FIG. 14 is a perspective view of a splice plate configured for installation into the frame of this invention;

FIG. 15 is a fragmentary perspective view of the frame indicating a splice and a plate positioned for securing same;

FIG. 16 is an exploded fragmentary perspective view of the frame and various removable tracks which are positioned in channels of the frame;

FIG. 17 is a similar view of removable tracks additionally illustating broken-away portions of the various panels which are positioned in channels of the removable tracks;

FIG. 18 is a side cross-sectional view of a hinged embodiment of the window assembly of this invention taken along lines 18—18 of FIG. 1;

FIG. 19 is a similar view of an upper broken-away portion of a hinged embodiment of the window assembly showing the hinge portion of the assembly in open position; and FIG. 20 is an exploded fragmentary perspective view illustrating the installation of a hinge assembly into the frame of a hinged embodiment of this invention.

DETAILED DESCRIPTION

Referring first to FIG. 1, there is illustrated a recreational vehicle 10 in which two embodiments of the present invention are shown installed, namely, window 12 which is a fixed embodiment and window 14 which is a hinged embodiment that may be swung away from the recreational vehicle.

THE FIXED EMBODIMENT

As shown in FIG. 2, window 12 is a fixed in position in an aperture 30 of vehicle wall 16. Window 12 comprises frame 18 which is substantially rectangular with rounded corners. A stationary glass panel 20, mounted in frame 18 subtends approximately one-half of the aperture formed by frame 18. A slidable glass panel 22, which is shown in its closed position, also subtends approximately one-half of the aperture formed by the frame. A slidable screen panel 28 is shown positioned immediately behind slidable glass panel 22, and slidable storm panels 24 and 26 are shown positioned behind glass panels 20 and 22 respectively. Finger pulls 25 and 27 are installed in storm panels 24 and 26 respectively and provide convenient means for sliding the storm panels within the frame.

Stationary glass panel 20 and slidable glass panel 22 may be secured to each other in a closed position by latch assembly 94. Because of the relative positions of stationary glass panel 20 and slidable panel 22, latch assembly 94 may be positioned on the center edge of the slidable glass panel as opposed to the frame edge of the slidable glass panel. This center position of latch assembly 94 is advantageous since it makes it unnecessary to slide screen panel 28 out of the way to have access to the latch assembly 94 for sliding the slidable glass panel in the direction of the stationary glass panel when opening the window.

Frame 18 is shaped to conform to the shape of the wall surface in which it is installed. By way of example, FIG. 3 shows frame 18 being curved slightly to conform to the shape of a wall section of recreational vehicle 10 which is slightly covex as viewed from the exterior. In one embodiment of this invention, the frame is curved to have a radius of curvature of about 151 inches.

The terms "exterior" and "interior" as used herein, refer to the exterior of the recreational vehicle and the interior of the recreational vehicle, as the case may be. The terms "outwardly" and "inwardly", on the other hand, refer to radial directions in the surface of the wall in which the window assembly is installed. Thus, the term outwardly means the direction in the surface of the wall extending away from the center of the window frame, and the term inwardly means the direction in the surface of the wall extending toward the center of the window frame.

FIGS. 5 and 6 illustrate the detailed interface between frame 18 and the various portions of the wall structure 16, adjacent aperture 30 in which the frame is installed. FIGS. 5 and 6 also illustrate the details of the installation of the various panels within the frame.

From FIGS. 5 and 6 it is readily apparent that the window assembly 12 is installed in aperture 30 which is bordered by vertical jamb members 40 and 42 along its side portions, header 32 along its top portion and sill 34 along its bottom portion.

The frame is firmly secured to the adjacent surfaces of wall aperture 30 by circumferential exterior mounting flange 52 and four retaining clamps 44.

Frame 18 is an extruded unitary structure of some easily worked material, such as aluminum alloy. The frame has a plurality of circumferential flanges. Some of the flanges extend radially inwardly toward the center of the rectangle formed by the frame and some of the flanges extend radially outwardly away from the center of the rectangle formed by the frame.

The inwardly extending flanges form a plurality of channels for receiving the various panels of the window. The outwardly extending flanges are used to provide interface means with the surfaces of the surrounding wall and to provide means for splicing the frame at a single joint.

The various flanges extend from frame base 62 which is sloped to permit drainage of water which would otherwise accumulate within the channels of the frame and the interior of the vehicle. As seen in FIGS. 5 and 6, an outermost channel 53 is formed by an exterior channel flange 84 and an intermediate channel flange 80. An intermediate channel 57 is formed by intermediate channel flange 80 and a second intermediate channel flange 82. An innermost channel 55 is formed by intermediate channel flange 82 and an interior channel flange 56.

Although frame 18 can be of a size and shape to accommodate any typical wall aperture for windows, the embodiment disclosed herein is generally rectangular with rounded corners. The radius of curvature of the corners of the frame in the plane of the window assembly disclosed herein are generally in the range of 3 inches to 6 inches. By way of example, in one embodiment of the window assembly of this invention, the radius of curvature R, shown in FIG. 2, is about 4.6 inches.

The minimum radius of curvature of the frame corners is limited by the modulus of elasticity of the material from which the frame is extruded. Typically, for common aluminum alloys used for window frames of the type described, 3 inches would be the approximate minimum radius of curvature permitting bending of the extrusion. However, smaller radii of curvature can be obtained using other methods of fabrication.

Panels 20 and 22 are about 33 inches high and 17.5 inches wide in one typical embodiment of the invention. Typically, the glass panels are tempered, tinted, and designed to meet the applicable requirements of Federal Motor Vehicle Safety Standards if the window assemblies are to be installed in recreational vehicles. The panels are in sufficient frictional engagement with the frame to preclude damage to open windows under normal conditions of acceleration and deceleration of the vehicle in which the window assembly is installed.

With the frame installed in aperture 30 of vehicle wall 16, an exterior mounting flange 52 is positioned adjacent to and overlapping the peripheral portion of exterior wall panel 36. However, mounting flange 52 is separated from the exterior wall panel by a sealing gasket 50, the details of which are discussed below.

Four retaining clamps 44 are attached to clamp flange 118 on the interior sides of the frame by means such as screw 46 to secure the frame within aperture 30. A brokenaway portion of one typical retaining clamp is illustrated in perspective view in FIG. 4. Clamps 44 are designed to engage two surfaces of the jambs, the header, or the sill, and to also engage the adjacent portion of clamp flange 118.

An interior wall panel 38 is installed along the perimeter of the frame in the outward interior channel 59 provided by interior channel flange 56 and an interior mounting flange 54.

The frame is a one-piece metal extrusion bent to form a rectangle joined at a single splice made with splice plate 74 as illustrated in FIGS. 5 and 15. A description of the splice plate and the means by which it is used to rigidly join the abutted ends of the extrusion, is provided below. The splice and the method of splicing are disclosed and claimed in co-pending patent application Ser. No. 550,735, filed by Philip R. Oiler on Feb. 18, 1975.

Stationary glass panel 20 is positioned in the outermost channel 53. As shown at the top of FIG. 5, the stationary glass panel is set against a glass shelf 126 within channel 53, but separated from shelf 126 by a spacer 70. An adhesive bedding 72 adheres the periphery of stationary glass 20 to intermediate channel flange 80 along the three edges of stationary glass panel 20 which are adjacent frame 18. A glazing bead 68 is installed in the outermost channel 53 between exterior channel flange 84 and glass shelf 126 to apply pressure against the exterior peripheral surface of stationary glass panel 20, thus securing the panel within the frame.

Slidable glass panel 22 slides within intermediate channel 57. Removable guide tracks, such as single-channel track 60, are positioned within this intermediate channel along the top, bottom and one side of the frame to provide guideways for the slidable glass panel 22.

Multiple channel tracks 58 are installed along the top and bottom portions of innermost channel 55. Screen panel 28 and storm panels 24 and 26 slide within respective channels of the multiple channel guide tracks, namely, channels 61, 63, and 65 respectively. Screen panel 28 utilizes a screen panel frame 76 having frame legs 172 and 174 which slide within screen channel 61.

As shown at the bottom of FIG. 5, a vent gasket 66 is installed between exterior channel flange 84 and glass shelf 126 of intermediate channel flange 80 and to apply pressure against the exterior peripheral edge of slidable glass panel 22. Vent gasket 66 and a glazing bead 68, shown at the top of FIG. 5, provide a removable weather resistant seal for panels 22 and 20 respectively, and also provide an attractive finish for the window as viewed from the exterior of the recreational vehicle.

Frame base 62 is sloped to permit drainage of water to the exterior of the vehicle. A drainage slot 64 extends through exterior channel flange 84 interior channel flange 80, to provide an exit path to drain water to the exterior of the vehicle.

SPLICING THE FRAME

As illustrated in FIG. 15, the respective ends of the extruded frame abut each other at a splice joint 116 and are each rigidly secured to splice plate 74 which lies within a splice channel 75 formed by clamp flange 118 and plate flange 120. Flanges 118 and 120 extend outwardly along the exterior periphery of the frame. The edges of splice plate 74 are in pressure engagement with the channel walls within grooves 122 and 123 of clamp flange 118 and plate flange 120 respectively.

Prior to installation in frame 18, splice plate 74 is bent slightly to reduce the distance between the elongated parallel edges of the plate so that the plate may be slidably inserted into the mating portions of the frame on each side of splice joint 116. The bent splice plate is then expanded in the channel to permit the parallel elongated edges to spread apart and to penetrate into the side walls of channel 75.

REMOVABLE TRACKS

Details of single-channel track 60 and multiple-channel tracks 58 and their respective frame channels are shown in FIGS. 16 and 17. Single-channel track 60 has widely spaced legs 140 and 142 which terminate in feet 150 and 152. The feet rest upon track ledges 128 and 130 respectively, elevated above the channel floor or base. By elevating track 60 in this manner, the base surface of the frame is unobstructed and drainage slot 64 can be utilized to drain water from channels 53 and 57 to the exterior of the vehicle without obstruction by single-channel track 60.

As illustrated in FIG. 17, the slidable glass panel rests within channel 67 formed by shoulders 160 and 162 of the single-channel track 60. As shown in FIG. 16, feet 150 and 152 are secured beneath the track beads 132 and 134 within the frame channel and thus prevent single-channel track 60 from being inadvertently released from the frame channel when not held in place by the window panel.

Side shoulders 164 and 166, legs 144, 146, and 148, and corresponding feet 154, 156, and 158 perform the same functions for the multiple-channel track 58 as the functions performed by the feet, legs, and shoulders of single-channel track 60. In addtion, intermediate shoulders 168 and 170 establish additional tracks thus making multiple-channel track 58 suitable for guiding a plurality of slidable panels which in the case of the embodiments illustrated and described, include screen panel 28 and storm panels 24 and 26. Panels 24, 26, and 28 each extend about one-half the width of the window assembly.

FIG. 17 indicates one or more beads running along the bottom surface of each removable track along which the sliding panel is guided for smooth and easy operation. The single-channel track has a series of such beads 176 while the multiple-channel track has one such bead 178 in the channel associated with each storm panel. Channel 61, associated with the screen panel, has two such beads located adjacent the side shoulder 164 and intermediate shoulder 168 respectively.

LATCH ASSEMBLY

One advantage provided by this invention is its capability to permit sliding open the slidable glass panel without first having to slide the screen panel to gain access to the latch securing the window. It is the center location of the latch assembly, which brings about this advantage. The center positioning of the latch assembly is made possible by the relative positions of stationary glass panel 20 and slidable glass panel 22.

Positioning stationary glass panel 20 in the outermost channel of frame 18 and slidable glass panel 22 in the immediately adjacent channel of frame 18, permits slidable glass panel 22 to slide in channel 57, that is, interior to channel 53 of the stationary glass panel 20.

Details of the latch assembly and the interface between the latch assembly and the glass panels are best indicated in FIGS. 6, 7, 8 and 9. As indicated in FIG. 6, the latch assembly is connected directly to the one edge of slidable glass panel 22 and may be removably secured to a catch 102 which is secured to a mullion 86. The mullion is attached to the corresponding edge of the stationary glass panel 20. A mullion seal 88, made of compressible material such as rubber and the like, is secured to mullon 86 along its entire edge to seal the gap between the stationary and the slidable glass panels. Weather strip 90, also secured to the mullion in the gap between the two panels throughout their height, aids in the sealing function and also provides a suitably smooth surface against which the slidable glass panel 22 may slide.

As indicated in FIG. 7, the latch assembly 94 comprises a latch 96 having a slot 108 which is fitted around a cylindrical portion 106 of latch base 98. In order to open the sliding window it is necessary to pull the latch assembly in the direction of bumper 92 (see FIG. 6). The pulling of the latch assembly to open the window causes latch 96 to rotate around the longitudinal axis of cylindrical portion 106 until latch slot 108 contacts base wall 110. This rotation is sufficient to completely withdraw hook 100 from notch 202 of catch 102. Latch 96 and latch base 98 are held together by spring 104 which also serves the purpose of resisting the rotation of latch 96 thus keeping the latch hook in a normally extended position corresponding to that required for preventing undesired opening of the window from the exterior of the vehicle.

As indicated in FIG. 8, the latch assembly is secured to the slidable glass panel but is separated therefrom by mounting tape 114, a soft rubber-like material such as rubber, vinyl and the like, which prevents damage to slidable glass panel 22 by precluding metal-to-glass contact.

As shown in FIG. 8, spring 104 has a hook 212 at one end which may be hooked over the top of the catch plate 102 to lock the latch assembly to the catch plate. A latch cap 105 is secured to the second end of the spring to permit vertical displacement of spring hook 212 above the catch by an upwardly directed force against the latch cap. This motion releases hook 212 from the top of the catch and allows normal functioning of the latch assembly for opening the window. The means by which catch plate 102 is secured to the mullion is illustrated in FIG. 9.

THE SEALING GASKET

When installed in a wall aperture, frame 18 is pulled against the vehicle wall 16 by four retaining clamps 44 so that the exterior mounting flange 52, and the sealing gasket 50 is inserted therein, engage the exterior wall panel 36 along the peripheral portion of the wall adjacent aperture 30. The sealing gasket 50 provides a means for minimizing the penetration of rain water and the like into the interior of the vehicle and also eliminates the requirement for application of caulking compound around the perimeter of the window.

The sealing gasket 50, utilized in the embodiment of the invention illustrated in FIG. 3, is illustrated in greater detail in FIG. 10. FIGS. 11 and 12 indicate two additional embodiments of the sealing gasket.

All of the sealing gaskets of FIGS. 10-12 have the following common features: An oblate bulb or tube 204, a key portion 206, and a plurality of splines 208. The splines are on the side of the bulb opposite the key portion. The embodiment of the sealing gasket illustrated in FIG. 10 has additional enlarged splines 210 along the peripheral portions of the bulb. In the sealing gasket of FIG. 11, the enlarged splines are omitted and the gasket has only two splines 208. The sealing gasket of FIG. 12 which also omits the enlarged splines, has five splines 208.

The bulb of the embodiments of the sealing gaskets illustrated in FIGS. 10-12 have an arcuately shaped upper portion from which the splines are extended, and a V-shaped lower portion from which the key portion is extended. This shape has been found to be readily compressible for sealing purposes. However, any general cylindrical shape, which is easily compressed into a collapsed configuration, would be sufficient for the sealing gasket bulb.

Key portion 206 is inserted in a corresponding key-shaped slot 214 in exterior mounting flange 52. The key portions shown in FIGS. 10, 11, and 12 are T-shaped, however any shape suitable for securing the sealing gasket within a corresponding shaped slot in exterior mounting flange 52, will suffice.

When the frame is pulled against the exterior wall surface, sealing gasket 50 is compressed against the exterior wall panel so that bulb 204 is flattened and the splines are in approximate alignment with each other and are compressed against the surface of the exterior wall panel 36. A plurality of splines, such as splines 208, increases the sealing effect of the gasket and improves the impenetrability of the seal against rain water and the like. The bulb shape permits variation in the degree of compression of the gasket between the external mounting flange and the exterior wall surface. This design is particularly advantageous on frames which have rounded corners, such as frame 18. One such corner of frame 18 is indicated in FIG. 13 which includes a cut-away view of the sealing gasket 50 showing that the various splines 208 conform to the curvature of the frame along the radius turn, with little or no distortion. The sealing gasket thus provides a uniform multi-barrier seal gainst the environment along the curved portions as well as the straight portions of the frame.

Although there are many suitable materials from which the sealing gasket may be fabricated, vinyl, having a hardness of from 60 to 70 Shore, has been found to be satisfactory in this application. The dimensions of the gasket are dependent on the structure of the window assembly. In the window assembly described herein, the dimension A shown in FIG. 10 is typically 0.3 inches. The gaskets of FIGS. 10, 11, and 12 are all drawn to the safe scale.

THE HINGED EMBODIMENT

Many of the details of hinged window 14 are identical to the details of fixed window 12 described above. Therefore, only the difference in details are discussed below.

One feature of the hinged window 14 which distinguishes it from fixed window 12, is hinge assembly 180 which comprises a stationary bracket 182, and a rotating bracket 184.

Typically, two hinge assemblies are utilized, both being located at the top of the window assembly. Stationary bracket 182 is secured to the exterior wall panel by screws such as screw 188. As shown in FIG. 19, rotating bracket 184 is secured to exterior mounting flange 52 just below the sealing gasket by screws such as screw 190.

FIG. 20 is provided to further illustrate the hinge assembly and the means for mounting it onto exterior mounting flange 52 at the top of frame 18.

Hinge bolt 186 secures rotating bracket 184 to stationary bracket 182 and also serves as the horizontal axis of rotation of the bracket and frame 18 so that the window assembly 14 may be swung away from vehicle wall 16. The interior mounting flange window 12 is omitted in window 14 to permit rotation of the entire window assembly. Similarly, retaining clamps 44, utilized to retain the frame or fixed window 12 in aperture 30 of wall assembly 16, are omitted in the hinged embodiment and are instead replaced with a single release clamp assembly 192 indicated in the lower portion of FIG. 18.

Release clamp assembly 192 comprises handle 194 which includes securing bracket 196 at one end. Securing bracket 196 normally rests in groove 122 of clamp flange 118 with the window in its installed position in the aperture of the vehicle wall. The release clamp assembly also includes fixed member 198, which is secured to sill 34, and swing bracket 200, which connects the handle to the fixed member.

An upwardly directed release force applied to the handle 194 forces handle 194 and swing bracket 200 to the upper positions indicated by the phantom lines in FIG. 18. The release action withdrawn securing bracket 196 from groove 122 thereby freeing the frame for rotation about hinge bolt 186. As handle 194 is released it is pushed against clamp flange 118 thus causing initial rotation of the frame about the hinges.

ON-SITE REGLAZING

In either the fixed embodiment of the window assembly or the hinged embodiment of the window assembly, vent gasket 66, glazing bead 68, multiple-channel track 58, and single-channel track 60 are all easily removable from the frame. In addition, the dimensions of the various panels are such that once the tracks in which they rest are removed, they too are easily removed from frame 18. As a result, any of the panels of the window of this invention may be easily replaced in the field without requiring removal of the entire window assembly or transporting the entire assembly to a factory or maintenance facility. This feature of the invention is particularly important for windows utilized in recreational vehicles which vehicles normally travel the highways and back roads of the country. The need for reglazing a window of such vehicles in some out-of-the-way location often arises.

In order to effect removal of the various panels, the glazing bead 68 is first removed from the frame to free stationary panel 20, and that panel is then tilted toward the exterior of the frame and removed. The vent gasket 66 is then removed and slidable panel 22, which is dimensioned to occupy one-half of the frame opening, is shifted to its open position to expose the flexible track member 60 in the other half of the frame opening. As shown in FIGS. 5 and 6, the tracks 60 extend across the top, bottom, and one side of panel 22, but not across the fourth side of panel 22; and when panel 22 has been moved to its open position, therefore, the exposed portions of track 60 can be removed by pulling them out of engagement with their related frame channels into the frame opening where, as the pulling continues, the track 60 is removed from the frame. Slidable glass panel 22 can then be readily removed. The further slidable panels 24, 26, and 28, which are also dimensioned to cover only one-half the frame opening, can then be moved to one side of the frame to expose flexible tracks 58 in the other half of the frame opening, whereafter tracks 58 can be pulled manually out of their associated track channel in a manner similar to that used to remove track 60, whereafter panels 24, 26, and 28 can be removed. Replacement of the tracks and panels can later be accomplished by reversing this sequence of removal steps.

SUMMARY

It is to be understood therefore that the invention disclosed is an improved on-site reglazable sliding window assembly and that the window assembly includes numerous novel features, some of which are disclosed herein and some of which will now be apparent to those of ordinary skill in the art.

From the foregoing, it is readily apparent that the horizontally slidable window assembly of this invention may be utilized also in permanent structures, such as homes and the like, and that many of the various improvements disclosed herein have applications other than for window assemblies. By way of example, the advantages derived by the use of sealing gasket 52 would result also from its use on a door panel which has rounded corners.

Changes in materials and in details of construction and shape of the invention herein described will now become apparent to those of ordinary skill in the art after having reference to the foregoing description and drawings. However, it is not intended that the scope of the invention be limited by the foregoing, but by the appended claims.

The invention claimed is:

1. An improved window assembly adapted for installation in an aperture of a recreational vehicle wall structure and comprising:
   a. a metal frame having a base and a plurality of approximately parallel inwardly extending flanges integral with and transverse to said base and surrounding said frame to form a plurality of channels therein of which the base provides a common floor, said frame also having an outwardly facing circumferential flange for surrounding said aperture and for lapping the outer surface of said wall structure adjacent said aperture, said floor being sloped with respect to a plane perpendicular to said wall structure, at least one of said channels having opposed ledges elevated above the floor of said channel and being adapted to support a flexible track member elevated above said floor, at least the two outermost flanges being slotted along a common axis adjacent said base to provide aligned drainage apertures through which any water in said one of said channels drains along said sloped floor to the exterior of said wall structure;
   b. a stationary removable glass panel positioned in the outermost one of said channels, a slidable removable glass panel positioned in an inner one of said channels for sliding therein;
   c. securing means positioned at the approximate center of said window assembly, said securing means comprising a latch member attached to a vertical edge of said slidable window panel and a catch member attached to a corresponding vertical edge of said stationary window panel whereby said latch member and said catch member may be securely interlocked for securing said window assembly in a closed configuration; and
   d. a flexible track member having a channel therein for slidably receiving one of said panels, said flexible track member being positioned in the said one of said channels having opposed ledges, said flexible track member having two separate legs, each such leg being positioned on a channel ledge whereby said track member is elevated above said channel floor to permit unobstructed drainage along the floor and through said aligned drainage apertures.

2. The window assembly of claim 1 wherein said circumferential flange has an elongated slot therein, a splined sealing gasket having a tubular bulb the longitudinal axis of which is about parallel to the longitudinal axis of said elongated slot and having a plurality of splines extending the length of said gasket, means for securing said gasket in said elongated slot, and clamp means extending between an inner surface of said wall structure and an interior side of said frame for drawing said frame toward the interior of the vehicle to cause said splines to compressively engage said outer surface of said wall structure adjacent said aperture when said window assembly is installed into said aperture from the outer surface of said wall structure.

3. An improved window assembly as defined in claim 1 wherein said frame is adapted to be swung away from said wall aperture by rotation about hinges attached to an edge of said frame, and also attached to the exterior wall surface adjacent said wall aperture when said window is installed, and wherein said assembly further comprises a release clamp assembly attached to the bottom edge of said frame and adapted to secure said frame to said wall adjacent said wall aperture and adpated to release said frame for rotation about said hinges.

4. The window assembly of claim 1, further comprising:
a removable screen panel and at least one removable slidable storm panel positioned in at least one further one of said channels.

* * * * *